(12) United States Patent
Zhao (10) Patent No.: US 9,588,932 B2
(45) Date of Patent: Mar. 7, 2017

(54) STORAGE CONTROL DEVICES AND INVOKING METHOD THEREOF

(71) Applicants: INVENTEC (PUDONG) TECHNOLOGY CORPORATION, Shanghai (CN); INVENTEC CORPORATION, Taipei (TW)

(72) Inventor: Wei-Guo Zhao, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 196 days.

(21) Appl. No.: 14/474,397

(22) Filed: Sep. 2, 2014

(65) Prior Publication Data
US 2016/0026598 A1   Jan. 28, 2016

(30) Foreign Application Priority Data
Jul. 28, 2014 (CN) .......................... 2014 1 0363423

(51) Int. Cl.
*G06F 9/00* (2006.01)
*G06F 13/42* (2006.01)
*G06F 13/16* (2006.01)
*G06F 13/40* (2006.01)
*G06F 3/06* (2006.01)
*G06F 9/445* (2006.01)

(52) U.S. Cl.
CPC ........ *G06F 13/4221* (2013.01); *G06F 3/0629* (2013.01); *G06F 9/44505* (2013.01); *G06F 13/1663* (2013.01); *G06F 13/1694* (2013.01); *G06F 13/4022* (2013.01)

(58) Field of Classification Search
None
See application file for complete search history.

(56) References Cited

U.S. PATENT DOCUMENTS

| | | | |
|---|---|---|---|
| 8,826,261 B1* | 9/2014 | Anand AG | G06F 8/665 712/243 |
| 2006/0107034 A1* | 5/2006 | Challener | G06F 9/4406 713/2 |
| 2007/0033390 A1* | 2/2007 | Chang | G06F 11/1417 713/2 |
| 2007/0050538 A1* | 3/2007 | Northcutt | G06F 3/0605 711/112 |

(Continued)

*Primary Examiner* — Kaushikkumar Patel
(74) *Attorney, Agent, or Firm* — Huffman Law Group, PC (57) ABSTRACT

A storage control device comprises a storage control module and a memory module. The storage control module is coupled between a central processing unit and a plurality of hard disk drives. The memory module is coupled with the storage control module and keeps a plurality of configuration files and a firmware for being executed by the storage control module. In one embodiment, the storage control module comprises at least one general-purpose input/output (GPIO) port and selects, according to whether the GPIO port is at a logical high or low electric potential, one of the configuration files to configure the firmware. The selected configuration file is invoked from a memory area of the memory module. In one embodiment, the storage control device further comprises at least one jumper point and selects, according to an open/close status of the jumper point, one of the configuration files to configure the firmware.

14 Claims, 4 Drawing Sheets

(56) References Cited

U.S. PATENT DOCUMENTS

| | | | |
|---|---|---|---|
| 2008/0003845 A1* | 1/2008 | Hong | H05K 1/14 439/67 |
| 2009/0265792 A1* | 10/2009 | Martinez | G06F 21/572 726/29 |
| 2010/0011202 A1* | 1/2010 | Murawski | G06F 9/441 713/2 |
| 2010/0037042 A1* | 2/2010 | Kuo | G06F 9/4403 713/2 |
| 2012/0005471 A1* | 1/2012 | Cumming | G06F 9/441 713/2 |
| 2012/0254598 A1* | 10/2012 | Mikuszewski | G06F 9/44505 713/1 |
| 2014/0113563 A1* | 4/2014 | Almomani | G07C 9/00817 455/41.2 |
| 2014/0136777 A1* | 5/2014 | Davis | G06F 3/0689 711/114 |

* cited by examiner

STORAGE CONTROL DEVICES AND INVOKING METHOD THEREOF

CROSS-REFERENCE TO RELATED APPLICATIONS

This non-provisional application claims priority under 35 U.S.C. §119(a) on Patent Application No. 201410363423.X filed in the People's Republic of China on Jul. 28, 2014, the entire contents of which are hereby incorporated by reference.

BACKGROUND OF THE INVENTION

Technical Field of the Invention

The present invention relates to server production technology, particularly to storage control devices and the invoking of their configuration files.

Description of the Related Art

The numerous hard disk drives installed in a server generally need to be managed by a storage control device, or exactly because of the storage control device, more than a certain number of hard disk drives can be installed in the server. The storage architectures of various products on a server production line are different. To operate properly, the storage control devices of these products have to invoke different configuration files even if they have the same hardware, a situation that often causes confusion to operators of the production line. Moreover, programming a storage control device to contain a configuration file is no walk in the park. When a whole batch of products is programmed with the wrong configuration file due to operator negligence, the loss and delay from resetting the production line cannot be considered insignificant.

SUMMARY OF THE INVENTION

The present invention discloses a plurality of storage control devices and an invoking method of their configuration files, so as to avoid the said confusion and reduce the personnel and temporal costs of error correction.

The disclosed invoking method may be employed by a storage control device to invoke a configuration file of the storage control device. The storage control device is based on Serial Attached SCSI (SAS) and comprises a memory module and at least one general-purpose input/output (GPIO) port. The invoking method comprises determining whether the GPIO port is at a logical high electric potential or a logical low electric potential to generate a result, and selecting according to the result to invoke the configuration file from one of a plurality of memory areas of the memory module.

One of the disclosed storage control devices comprises a storage control module and a memory module. The storage control module is coupled between a central processing unit (CPU) and a plurality of hard disk drives and comprises at least one GPIO port. The memory module is coupled with the storage control module and keeps a plurality of configuration files and a piece of firmware. The firmware is adapted for being executed by the storage control module. The storage control module selects, according to whether the at least one GPIO port is at a logical high electric potential or a logical low electric potential, one of the configuration files to configure the firmware.

In an embodiment, the said firmware has an invoking unit. The storage control module is adapted for executing the invoking unit to selectively invoke one of the configuration files from the memory module according to whether the at least one GPIO port is at a logical high electric potential or a logical low electric potential.

In an embodiment, the number of the at least one GPIO port is two and the number of the configuration files is four. The logical electric potentials of the two GPIO ports form four different status combinations, each of which corresponds to one of the configuration files.

In an embodiment, the said storage control device further comprises at least one jumper point. Each of the at least one jumper point is correspondingly connected with one of the at least one GPIO port, and each of the at least one jumper point is adapted for controlling whether the GPIO port correspondingly connected with the jumper point is at a logical high electric potential or a logical low electric potential. The storage control module is directed through operation toward the at least one jumper point to select one of the configuration files to configure the firmware.

The memory module may comprise a plurality of first memory areas, in which the configuration files are each correspondingly kept. In an embodiment, the storage control module determines whether each of the at least one GPIO port is at a logical high electric potential or a logical low electric potential to generate a result, the result forms a numeral, and the first memory area in which the selected configuration file is kept corresponds to the numeral. In an embodiment, the memory module further comprises a second memory area and a third memory area. The firmware is kept in the second memory area, the third memory area is adapted for keeping a SAS address of the storage control module, and the storage control module further invokes the SAS address to operate. In an embodiment, each of the configuration files comprises a default SAS address of the storage control module.

In an embodiment, the storage control module is a southbridge, a SAS expander, or a Serial Advanced Technology Attachment (SATA) expander.

Another of the disclosed storage control devices comprises a storage control module, at least one jumper point, and a memory module. The storage control module is coupled between the CPU and a plurality of hard disk drives and with the at least one jumper point and the memory module. The memory module keeps a plurality of configuration files and a piece of firmware. The firmware is adapted for being executed by the storage control module. The storage control module selects, according to an open/close status of the at least one jumper point, one of the configuration files to configure the firmware.

In an embodiment, the said firmware has an invoking unit, and the storage control module is adapted for executing the invoking unit to selectively invoke one of the configuration files from the memory module according to the open/close status of the at least one jumper point.

In an embodiment, the number of the at least one jumper point is two and the number of the configuration files is four. The open/close statuses of the two jumper points form four different status combinations, each of which corresponds to one of the configuration files.

The memory module may comprise a plurality of first memory areas, in which the configuration files are each correspondingly kept. In an embodiment, the storage control module comprises at least one GPIO port. Each of the at least one jumper point is correspondingly connected with one of the at least one GPIO port, and the open/close status of each of the at least one jumper point is associated with whether the GPIO port correspondingly connected with the jumper point is at a logical high electric potential or a logical low electric potential. In an embodiment, the storage control module determines whether each of the at least one GPIO port is at a logical high electric potential or a logical low electric potential to generate a result, the result forms a numeral, and the first memory area in which the selected configuration file is kept corresponds to the numeral. In an embodiment, the memory module further comprises a second memory area and a third memory area. The firmware is kept in the second memory area, the third memory area is adapted for keeping a SAS address of the storage control module, and the storage control module further invokes the SAS address to operate.

In an embodiment, each of the configuration files comprises a default SAS address of the storage control module.

In an embodiment, the storage control module is a southbridge, a SAS expander, or a SATA expander.

In short, according to the present invention, every product on the same production line can be programmed with all the configuration files that may be confused. Through operation toward the jumper point or adjustment of the logical electric potential of the GPIO port, an operator of the production line can make the storage control devices of various servers select different configuration files. Even if there is operator negligence, the error is readily noticeable and can be swiftly fixed by the same means.

The contents of the present invention set forth and the embodiments hereinafter are for demonstrating and illustrating the spirit and principles of the present invention, and for providing further explanation of the claims.

BRIEF DESCRIPTION OF THE DRAWINGS

The present invention will become more fully understood from the detailed description given hereinbelow and the accompanying drawings, which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
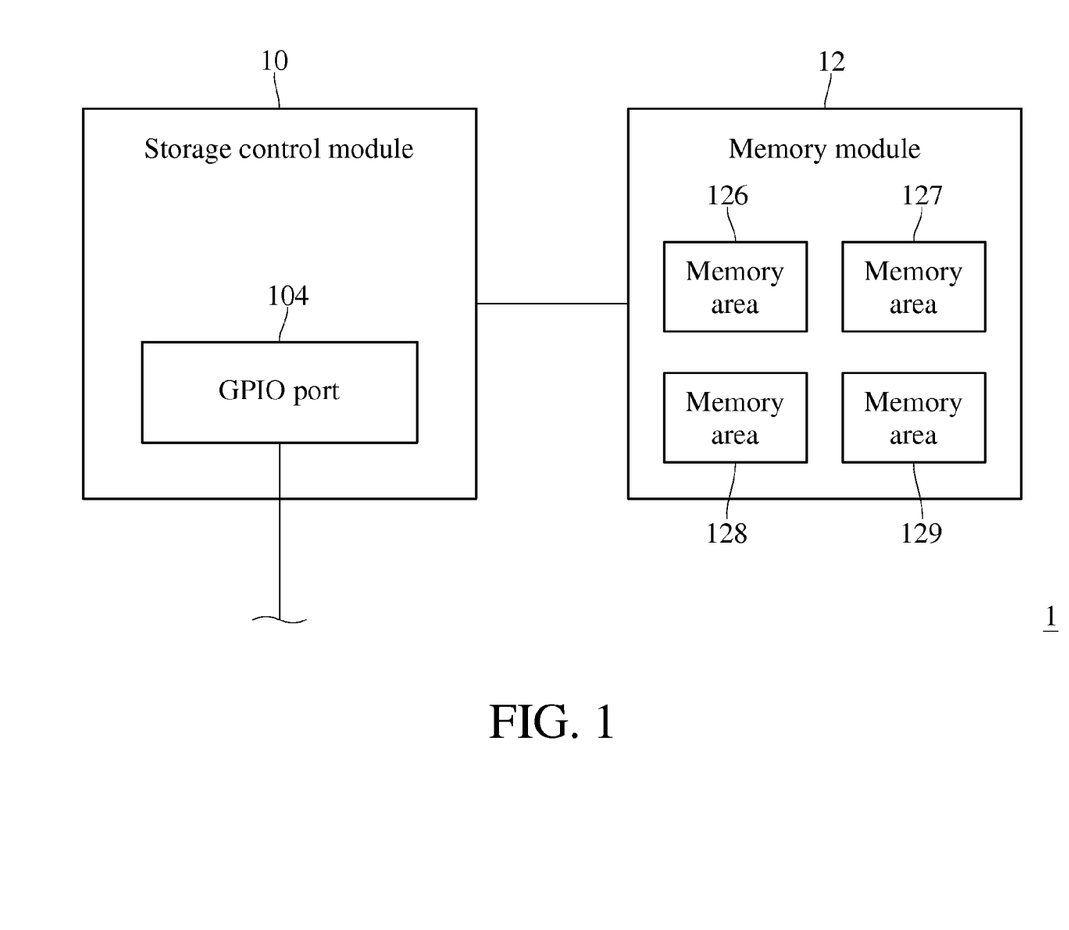
FIG. 1 to FIG. 3 are block diagrams of storage control devices according to various embodiments of the present invention.

Please refer to FIG. 1. FIG. 1 is a block diagram of a storage control device according to an embodiment of the present invention. As shown in FIG. 1, the storage control device 1 comprises a storage control module 10 and a memory module 12. The storage control module 10 is coupled with the memory module 12 and comprises at least one general-purpose input/output (GPIO) port, e.g. the depicted GPIO port 104. The memory module 12 may be a flash memory, another type of electrically erasable programmable read-only memory (EEPROM), or any non-volatile memory. The memory module 12 keeps a firmware adapted for being executed by the storage control module 10 and a plurality of configuration files whereby the storage control module 10 configures the firmware. The present invention does not limit how these configuration files and firmware are kept. For example, if the memory module 12 has some kind of a low-level file system, that which accesses the memory module 12 does not need to understand the hardware detail of the memory module 12. One may simply specify to the memory module 12 what document or file it wishes to invoke and receive that document or file from the memory module 12. A plurality of memory areas may as well be demarcated in the memory module 12 in advance, each such area having a purpose, e.g. for keeping certain information. In the present embodiment, the memory module 12 comprises memory areas 126 to 128 and keeps two configuration files: one is in the first memory area 126, the other is in the first memory area 127, and the said firmware is in the second memory area 128.

As the break line in FIG. 1 suggests, the GPIO port 104 is externally controlled and may be at different electric potentials. An electric potential is usually defined relative to a ground or infinity. The storage control module 10 in general operates digitally. When the GPIO port 104 is at a logically or relatively high electric potential, the storage control module 10 selects one of the aforementioned two configuration files, such as the one in the memory area 126. When the GPIO port 104 is at another electric potential that is logically or relatively low, the storage control module 10 selects and invokes the configuration file in the memory area 127 and thereby configures the firmware. Specifically, in one embodiment, part of the program code, object code or machine code of the firmware in the memory area 128 is an invoking unit. The storage control module 10 cannot execute the firmware without executing the invoking unit, especially when initializing. The invoking unit causes the storage control module 10 to select as described above one of the configuration files base on the electric potential of the GPIO port 104 or some other GPIO port. In other words, for each of the configuration files, the invoking unit causes the storage control module 10 to decide whether to invoke that configuration file or not. In one embodiment, the invoking unit causes the storage control module 10 to select one of the (first) memory areas 126 and 127, and thus invoke the configuration file in that memory area. In particular, the result of the storage control module 10 determining whether each GPIO port (including 104) is at a logical high or low electric potential forms, corresponds to, or may be interpreted as a numeral. Different numerals correspond to different memory areas. For example, suppose that the GPIO port 104 at a logical low electric potential is interpreted as a binary '0'. By table-lookup, by design, or by executing the invoking unit the storage control module 10 is able to deduce that 0 corresponds to the memory area 126, whence the storage control module 10 obtains the specified configuration file.

Figure 2:
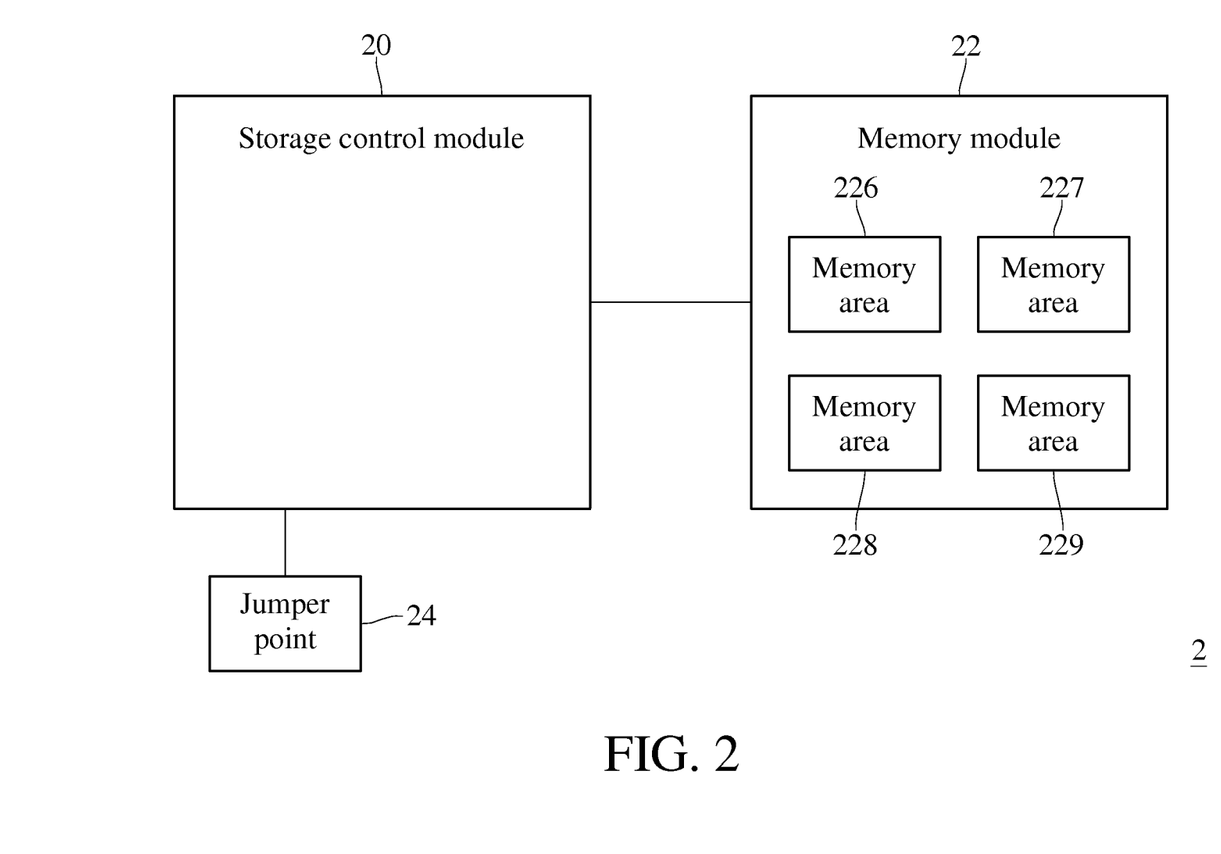

Please refer to FIG. 2 in association with FIG. 1. FIG. 2 is a block diagram of a storage control device according to another embodiment of the present invention. As shown in FIG. 2, the storage control device 2 comprises a storage control module 20, a memory module 22, and at least one jumper point, e.g. the depicted jumper point 24. The storage control module 20 is coupled with the memory module 22 and the jumper point 24. The memory module 22 is similar to 12. In this embodiment, it is assumed that the two configuration files are respectively kept in the first memory areas 226 and 227, and the firmware is kept in the second memory area 228.

A jumper point is usually used in conjunction with a jumper (a jumper shunt to be exact) as a switch. A jumper point is often constructed as several jumper pins; a plurality of jumper points may constitute a jumper block. For example, the jumper point 24 may be two jumper pins close to but separate from each other, so the jumper point 24 is a point of open circuit until a jumper shunt is attached and bridges the two pins to render the circuit conducting. Of course the jumper point 24 may as well be designed as conducting by default and only opened when attached with an insulating jumper shunt, or the jumper point 24 is a switch by itself. Analogous to how the storage control module 10 determines the logical electric potential of the GPIO 104, the storage control module 20 selects from the configuration files in the memory module 22 according to the open/close status of the jumper point 24 or some other jumper point. For example, when the jumper point 24 is open, the storage control module 20 selects one of the aforementioned two configuration files, such as the one in the memory area 226. When the jumper point 24 is conducting, the storage control module 20 selects and invokes the configuration file in the memory area 227 and thereby configures the firmware. As described above, in one embodiment, the firmware in the memory area 228 has an invoking unit. When executed by the storage control module 20, the invoking unit causes the storage control module 20 to decide, for each of the configuration files in the memory module 22, whether to invoke that configuration file, or to select one of the (first) memory areas 126 and 127 and thus invoke the configuration file in that memory area, all according to the open/close status of the jumper point 24.

Figure 3:
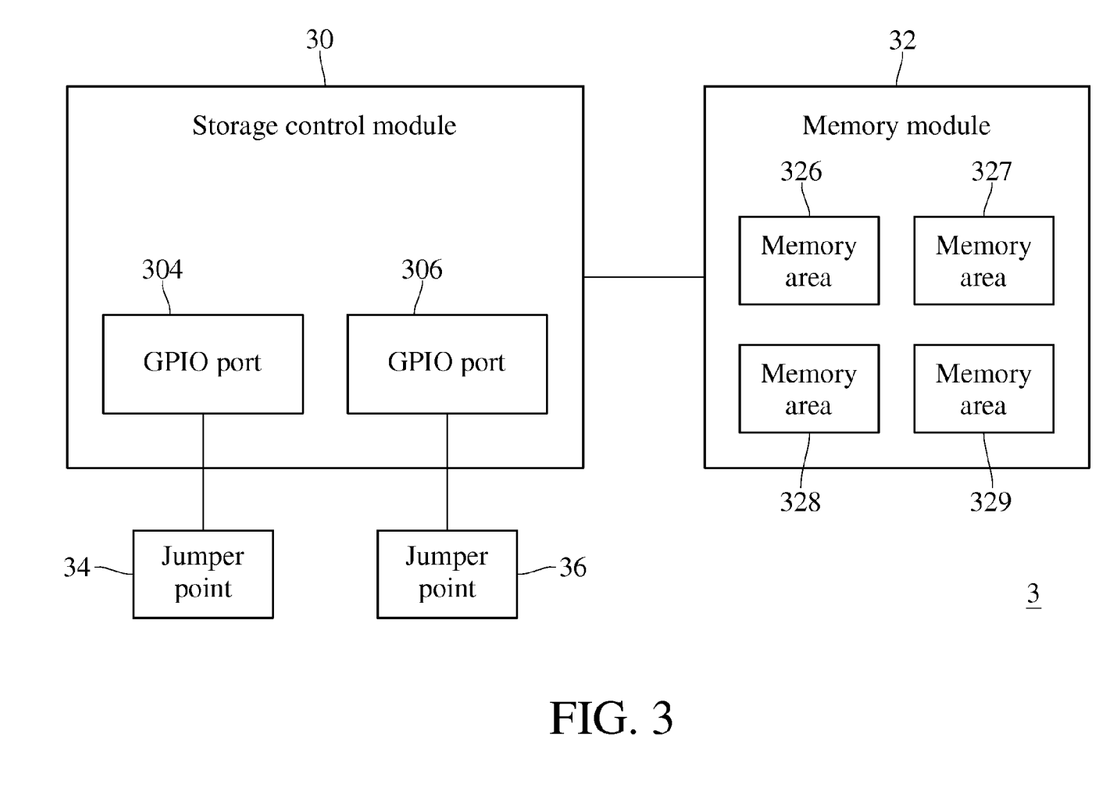

Please refer to FIG. 3 in association with FIG. 1 and FIG. 2. FIG. 3 is a block diagram of a storage control device according to another embodiment of the present invention. As shown in FIG. 3, the storage control device 3 comprises a storage control module 30, a memory module 32, and jumper points 34 and 36. The storage control module 30 is coupled with the memory module 32 and comprises two GPIO ports 304 and 306. The storage control module 30 is coupled with the jumper points 34 and 36 at the GPIO ports 304 and 306, respectively. The memory module 32 is similar to 12 or 22, except that in this embodiment there are four configuration files respectively kept in four memory areas 326 to 329, and the firmware is somewhere else in the memory module 32. The storage control device 3 may be regarded as the storage control device 1 further comprising two jumper points and the storage control module 10 comprising two corresponding GPIO ports (including 104 or not), or as the storage control device 2 comprising two jumper points (including 24 or not) and the storage control module 20 is given the feature of comprising the corresponding two GPIO ports.

Figure 4:
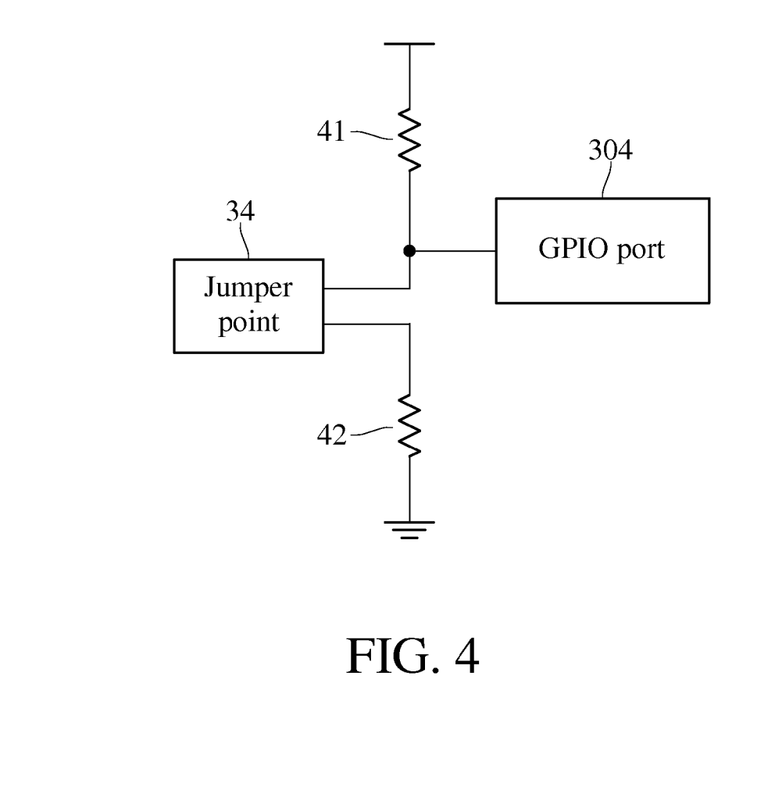
FIG. 4 is, in accordance with an embodiment of the present invention, a circuit diagram of a GPIO port and a jumper point.

The respective open/close statuses of the two jumper points 34 and 36 form two times two or four status combinations, which may correspond to the aforementioned four configuration files. (Likewise, if there were three jumper points then $2^3$ status combinations could be formed.) The jumper points 34 and 36 are further respectively associated with whether the GPIO ports 304 and 306, with which they connect, are at logical high or low electric potentials. Please refer to FIG. 4 for an exemplary circuit diagram of the GPIO port 304 and the jumper point 34. As shown in FIG. 4, when the jumper point 34 is closed, the electric current flows from a power source or a fixed high potential (e.g. 3.3 volts) to the ground through an impedance 41, the jumper point 34, and the impedance 42, in that order. The electric potential that the storage control module 30 senses through the GPIO port 304 is therefore the fixed high potential minus the voltage drop across the impedance 41. It should be apparent to persons skilled in the art that the impedances 41 and 42 serve in FIG. 4 as placeholders in the circuit from the power source to the ground for components which are not directly involved with the storage control device 3 besides passively affecting the said voltage drop. There is no voltage drop across the impedance 41 when the jumper point 34 is non-conducting, and the GPIO port 304 is at a logical high electric potential close to the fixed high electric potential.

Consequently, by opening or closing the jumper points 34 and 36 through switching operations such as attaching or removing jumper shunts, the jumper points 34 and 36 essentially control the logical electric potentials of the GPIO ports 304 and 306. The two GPIO ports 304 and 306 are respectively at either a logical high or low electric potential, forming two times two or four different status combinations. (Likewise, if there were three GPIO ports then $2^3$ status combinations could be formed.) These status combinations may be in one-to-one correspondence with the four configuration files in the memory areas 326 to 329. For example, when the GPIO port 304 is at a logical low electric potential and the GPIO port 306 is at a logical high electric potential, the storage control module 30 selects one of the four configuration files, such as the one in the memory area 327. When the GPIO port 304 is also at a logical high electric potential, the storage control module 30 selects and invokes the configuration file in, say, the memory area 329 and thereby configures the firmware. Suppose that the GPIO port 304 or 306 is determined or interpreted by the storage control module 30 as a binary '0' when at a logical low electric potential, and as a '1' when at a high one, then the aforementioned status combinations may be expressed as numerals like '00', '01', '10', and '11'. Different numerals correspond to different memory areas. Once the storage control module 30 is able to deduce that '00' corresponds to the memory area 326 by table-lookup, by design, or by executing the invoking unit, it obtains the specified configuration file from the memory area 326.

Figure 5:
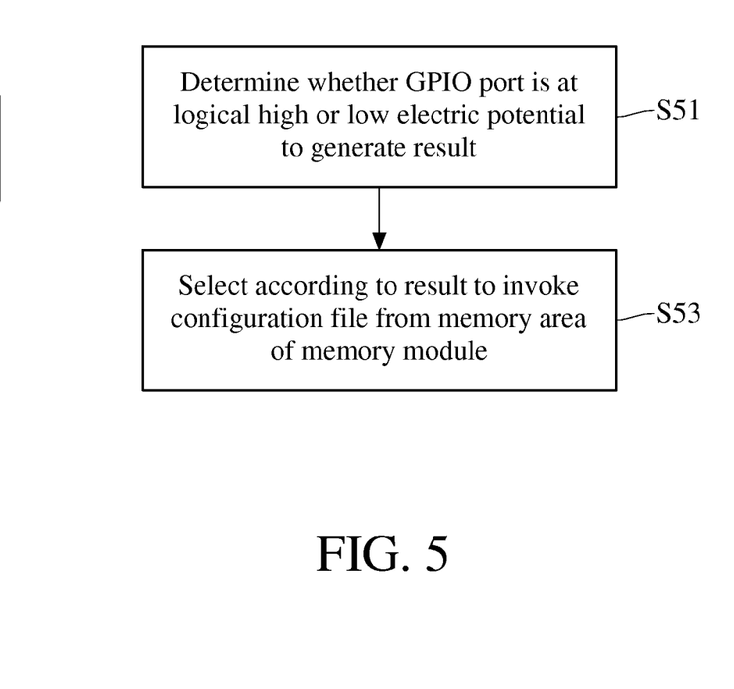
FIG. 5 is a flowchart of an invoking method according to an embodiment of the present invention.

In one embodiment, the storage control module 10, 20, or 30 is based on Serial Attached SCSI (SAS), wherein it may be an expander or port multiplier which, thanks to being a storage switch or router in a server, manages a plurality of SAS devices (e.g. hard disk drives). As an example, the storage control module 10 is coupled between a central processing unit (CPU) and a plurality of hard disk drives of the said server and is configured to control data transmission between the CPU and the drives, or between the drives themselves. Please refer to FIG. 5 in association with FIG. 1. FIG. 5 is a flowchart of an invoking method according to an embodiment of the present invention. The invoking method is for the storage control device 1 to invoke a configuration file in the memory module 12. Specifically, in step S51, the logical electric potential of the GPIO port 104 is determined. Based on the result of the determination, the storage control module 10 selects the memory area 126 or 127 in step S53 to invoke the configuration file therein. For instance, it may be that the storage control module 10 obtains the specified configuration file from the memory area 127 and thereby configures the firmware when the GPIO port 104 is at a logical low electric potential. In other words, the storage control module 10 selects the configuration file in the memory area 127, or decides not to invoke the configuration file in the memory 126.

A configuration file of a SAS expander often comprises a SAS-complying address of the expander on a storage network. The address may be a default. In one embodiment, to continue with the previous paragraph, the configuration files in the memory areas 126 and 127 record the same default SAS address. The address may as well be randomly generated, wherein the storage control module 10 might take on different SAS addresses as a result of invoking different configuration files. It may not be ideal in practice that configuration files record dissimilar addresses. In one embodiment, the memory module 12 further comprises a third memory area 129 for keeping the SAS address that the storage control module 10 actually invokes for operation, wherein the storage control module 10 ignores the addresses included in the configuration files, or the configuration files do not record any default or random address. In FIG. 2, the SAS address the storage control module 20 invokes for operation is in the memory area 229.

The storage control module 10, 20, or 30 may as well be a Serial Advanced Technology Attachment (SATA) expander or port multiplier, or a circuit that on a motherboard of the server controls data transmission between the CPU and the peripheral storage, such as an Input/Output Controller Hub, a Platform Controller Hub, or a southbridge as it is known colloquially. In practice, the circuit may also be integrated to a CPU of a broad sense. On integrated circuits or chips there are usually pins reserved that are not directly related to the main function but may somewhat allow for external customization of the chip. The GPIO port 104, 304, or 306 may be implemented at these pins.

In conclusion, the present invention provides a plurality of storage control devices, each of which comprises at least one jumper point, or the storage control module of each of which comprises at least one GPIO port. As illustrated by the invoking method of the present invention, the storage control module determines the logical electric potential of the GPIO port or the open/close status of the jumper point to be directed to select the configuration file to be invoked. In some embodiments, that the GPIO port is at a logical high or low electric potential is associated with the open/close status of the jumper point. The storage control module having features of directability and selection, the memory module can be multiply programmed, and an external party (e.g. an operator of the production line) can switch with ease the configuration file invoked by the storage control module.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A storage control device, comprising:
   a storage control module comprising at least one general-purpose input/output (GPIO) port and coupled between a central processing unit and a plurality of hard disk drives; and
   a memory module coupled with the storage control module and keeping a plurality of configuration files and a firmware, the firmware configured for being executed by the storage control module;
   wherein the memory module comprises a plurality of first memory areas, a second memory area, and a third memory area, the configuration files are each correspondingly kept in the first memory areas, the firmware is kept in the second memory area, the third memory area is configured for keeping a Serial Attached SCSI (SAS) address of the storage control module, the storage control module selects, according to whether the at least one GPIO port is at a logical high electric potential or a logical low electric potential, one of the configuration files to configure the firmware, and the storage control module further invokes the SAS address to operate.

2. The storage control device of claim 1, wherein the firmware has an invoking unit, and the storage control module is configured for executing the invoking unit to selectively invoke one of the configuration files from the memory module according to whether the at least one GPIO port is at a logical high electric potential or a logical low electric potential.

3. The storage control device of claim 1, wherein the memory module comprises a plurality of first memory areas, the first memory areas each correspondingly keeps the configuration files, the storage control module determines whether each of the at least one GPIO port is at a logical high electric potential or a logical low electric potential to generate a result, the result forms a numeral, and the first memory area in which the selected configuration file is kept corresponds to the numeral.

4. The storage control device of claim 1, wherein the number of the at least one GPIO port is two, logical electric potentials of the two GPIO ports form four different status combinations, the number of the configuration files is four, and each of the status combinations corresponds to one of the configuration files.

5. The storage control device of claim 1, further comprising at least one jumper point, wherein each of the at least one jumper point is correspondingly connected with one of the at least one GPIO port, and each of the at least one jumper point is configured for controlling whether the GPIO port correspondingly connected with the jumper point is at a logical high electric potential or a logical low electric potential, so that the storage control module is directed through operation toward the at least one jumper point to select one of the configuration files to configure the firmware.

6. The storage control device of claim 1, wherein each of the configuration files comprises a default SAS address of the storage control module.

7. The storage control device of claim 1, wherein the storage control module is a southbridge, a SAS expander, or a Serial Advanced Technology Attachment expander.

8. A storage control device, comprising:
   a storage control module coupled between a central processing unit and a plurality of hard disk drives;
   at least one jumper point coupled with the storage control module; and
   a memory module coupled with the storage control module and keeping a plurality of configuration files and a firmware, the firmware configured for being executed by the storage control module;
   wherein the memory module comprises a plurality of first memory areas, a second memory area, and a third memory area, the configuration files are each correspondingly kept in the first memory areas, the firmware is kept in the second memory area, the third memory area is configured for keeping a Serial Attached SCSI (SAS) address of the storage control module, the storage control module selects, according to an open/close status of the at least one jumper point, one of the configuration files to configure the firmware, and the storage control module further invokes the SAS address to operate.

9. The storage control device of claim 8, wherein the storage control module comprises at least one general-purpose input/output (GPIO) port, each of the at least one jumper point is correspondingly connected with one of the at least one GPIO port, and the open/close status of each of the at least one jumper point is associated with whether the GPIO port correspondingly connected with the jumper point is at a logical high electric potential or a logical low electric potential.

10. The storage control device of claim 9, wherein the memory module comprises a plurality of first memory areas, the first memory areas each correspondingly keeps the configuration files, the storage control module determines whether each of the at least one GPIO port is at a logical high electric potential or a logical low electric potential to generate a result, the result forms a numeral, and the first memory area in which the selected configuration file is kept corresponds to the numeral.

11. The storage control device of claim 8, wherein the number of the at least one jumper point is two, the open/close statuses of the two jumper points form four different status combinations, the number of the configuration files is four, and each of the status combinations corresponds to one of the configuration files.

12. The storage control device of claim 8, wherein each of the configuration files comprises a default SAS address of the storage control module.

13. The storage control device of claim 8, wherein the storage control module is a southbridge, a SAS expander, or a Serial Advanced Technology Attachment expander.

14. The storage control device of claim 8, wherein the firmware has an invoking unit, and the storage control module is configured for executing the invoking unit to selectively invoke one of the configuration files from the memory module according to the open/close status of the at least one jumper point.

* * * * *